US010571046B1

(12) United States Patent
Lambeth

(10) Patent No.: US 10,571,046 B1
(45) Date of Patent: Feb. 25, 2020

(54) UTILITY LINE SHROUD

(71) Applicant: Spencer J Lambeth, Sandy Springs, GA (US)

(72) Inventor: Spencer J Lambeth, Sandy Springs, GA (US)

( * ) Notice: Subject to any disclaimer, the term of this patent is extended or adjusted under 35 U.S.C. 154(b) by 0 days.

(21) Appl. No.: 16/250,754

(22) Filed: Jan. 17, 2019

(51) Int. Cl.
*F16L 1/11* (2006.01)
*E03B 9/10* (2006.01)

(52) U.S. Cl.
CPC .. *F16L 1/11* (2013.01); *E03B 9/10* (2013.01)

(58) Field of Classification Search
CPC ...... F16L 1/06; F16L 1/11; E03B 9/10; Y10T 137/6995; Y10T 137/7021; Y10T 137/7006; E02D 29/14
USPC .......................................... 137/363, 364, 371
See application file for complete search history.

(56) References Cited

U.S. PATENT DOCUMENTS

| | | | | |
|---|---|---|---|---|
| 2,099,479 A * | 11/1937 | Heinkel | ..................... | E03B 9/10 137/367 |
| 2,942,625 A | 6/1960 | Costanzo | | |
| 3,166,041 A | 1/1965 | Caggainello | | |
| 3,322,198 A | 5/1967 | McHenry | | |
| 3,561,470 A * | 2/1971 | Hawle | ....................... | E03B 9/10 137/371 |
| 3,717,963 A * | 2/1973 | Sauriol | ................... | G01F 15/14 52/19 |
| 3,728,464 A | 4/1973 | Griffing | | |
| 3,746,034 A * | 7/1973 | Cosson | ..................... | F16L 1/11 137/364 |
| 3,927,637 A * | 12/1975 | Sammaritano | ........... | H02G 9/00 33/1 H |
| 4,275,757 A | 6/1981 | Singer | | |
| 4,325,405 A * | 4/1982 | Christo | ............... | E02D 29/1409 137/370 |
| 4,534,378 A * | 8/1985 | Gagas | ................... | F16K 27/006 137/367 |
| 4,757,595 A | 7/1988 | Fraering, Jr. | | |
| 5,003,735 A | 4/1991 | Bates | | |
| 5,044,303 A | 9/1991 | Culver, Jr. | | |
| 5,063,996 A | 11/1991 | Kenner | | |
| 5,092,556 A | 3/1992 | Darling et al. | | |
| 5,176,408 A | 1/1993 | Pedersen | | |

(Continued)

FOREIGN PATENT DOCUMENTS

CA 1272074 A * 7/1990 ............... E03B 9/02
CA 1272074 A 7/1990

(Continued)

OTHER PUBLICATIONS

City of Lake Oswego Engineering Division; "Typical Sanitary Sewer Cleanout: Drawing No. WW3-01B"; www.ci.oswego.or.us/publicworks/ww3-01b; 1998; 1 page; City of Lake Oswego; Lake Oswego, Oregon, USA.

(Continued)

*Primary Examiner* — Frederick L Lagman
(74) *Attorney, Agent, or Firm* — Thomas B. McGurk

(57) ABSTRACT

A shroud assembly for covering a portion of a utility line is encompassed by the present disclosure. The shroud assembly can include a shroud forming a cavity for aligning with a portion of a utility line and an access port for accessing the utility line and a marker removably connected to the shroud to mark the location of the portion of the utility line that is covered.

30 Claims, 14 Drawing Sheets

(56) References Cited

U.S. PATENT DOCUMENTS

| | | | |
|---|---|---|---|
| 5,234,280 A | | 8/1993 | Cowan |
| 5,623,971 A | * | 4/1997 | Foernzler .............. E03F 5/0406 |
| | | | 116/209 |
| 5,642,973 A | | 7/1997 | Pretty |
| 5,769,565 A | | 6/1998 | Martin, Jr. et al. |
| 6,032,697 A | | 3/2000 | Kennedy |
| 6,062,506 A | | 5/2000 | Eck et al. |
| 6,083,392 A | | 7/2000 | Rigney |
| 6,109,824 A | | 8/2000 | Annes |
| 6,164,317 A | | 12/2000 | Hanson |
| 6,321,679 B1 | | 11/2001 | Murrin et al. |
| 6,354,325 B1 | * | 3/2002 | Warnes .................... E03B 9/10 |
| | | | 137/367 |
| 7,117,883 B1 | * | 10/2006 | Vitalo ....................... E03B 9/08 |
| | | | 137/366 |
| 7,228,813 B2 | | 6/2007 | Flamingo et al. |
| 8,757,930 B2 | | 6/2014 | Kiest, Jr. |
| 8,844,559 B1 | | 9/2014 | Dry |
| 9,518,369 B2 | | 12/2016 | Ducote et al. |
| 10,047,877 B2 | | 8/2018 | Lambeth |
| 2002/0073915 A1 | | 6/2002 | Howard |
| 2004/0231724 A1 | * | 11/2004 | Mahaney ................. H02G 9/10 |
| | | | 137/371 |
| 2008/0142108 A1 | | 6/2008 | Baker et al. |
| 2009/0044869 A1 | * | 2/2009 | Brown ................... A01G 25/06 |
| | | | 137/363 |
| 2016/0369917 A1 | * | 12/2016 | Lambeth ................... F16L 1/11 |
| 2019/0169806 A1 | * | 6/2019 | Coursey ................. E01F 9/629 |

FOREIGN PATENT DOCUMENTS

| | | |
|---|---|---|
| DE | 2134941 A1 | 2/1973 |
| DE | 202012004001 U1 | 5/2012 |
| DE | 2020171021 U1 | 5/2017 |
| EP | 2474671 A2 | 7/2012 |
| KR | 20020034141 A | 5/2002 |

OTHER PUBLICATIONS

City of Lake Oswego Engineering Division; "Typical Sanitary Sewer Cleanout: Drawing No. WW3-01A"; www.ci.oswego.or.us/publicworks/ww3-01a; 2000; 1 page; City of Lake Oswego; Lake Oswego, Oregon, USA.

The Dobbie Dico Meter Co. (W.A.) Pty Ltd; "Access Ground Covers"; www.dobbie.com.au/node/117; 1 page; The Dobbie Dico Meter Co. (W.A.) Pty Ltd; Malaga, Western Australia.

International Searching Authority/US; "PCT International Search Report: PCT/US2016/038383";PCT/ISA/210; W02016209771; 2016; 4 pages; International Searching Authority/US; Alexandria, Virginia, USA.

International Searching Authority/US; "PCT Written Opinion of the International Searching Authority: PCT/US2016/038383";PCT/ISA/210; W02016209771; 2016; 5 pages; International Searching Authority/US; Alexandria, Virginia, USA.

Ford Meter Box Company, Inc.; "Ford Type X Single Lid Covers/Ford PMBC-3 Plastic Meter Box Cover"; www.fordmeterbox.com/products; Jun. 2015; 2 pages; Ford Meter Box Company, Inc.; Wabash, Indiana, USA.

NDS, Inc.; "Valve and Meter Boxes"; www.ndspro.com; Jun. 2015; 2 pages; NDS, Inc.; Lindsay, California, USA.

\* cited by examiner

UTILITY LINE SHROUD

TECHNICAL FIELD

The present disclosure is directed generally to protective covers, and, more specifically, to protective shrouds for in-ground utility lines.

BACKGROUND

When a building is connected to a municipal sewer line, a clean out pipe typically is installed in conjunction with the line leading from the building to the sewer to allow access to both for line maintenance. The access end of the clean out line typically is installed at or below grade level. In the case of residential units, most jurisdictions require a separate clean out line for each unit. Thus, for multi-unit construction, such as townhomes, several clean out lines can be installed in a relatively small space. During construction of a building, heavy trucks and other equipment are often driven over ground containing one or more clean out lines and other utility lines, thereby raising the risk of damage to these lines, Consequently, there is a need for a system that can potentially provide some protection for and warning of the presence of an in-ground utility line, such as a sewer clean out line.

SUMMARY

The present disclosure encompasses a shroud assembly for covering a portion of an in-ground utility line, the shroud assembly comprising a shroud comprising a neck and a skirt extending from the neck, wherein the skirt defines a cavity, wherein the skirt comprises a base, wherein the base defines a base opening, wherein the base opening opens to the wherein the neck comprises a shroud lip, wherein the shroud lip defines an access port, wherein the access port is in communication with the cavity, Wherein the cavity is configured to align with a portion of an in-ground utility line through the base opening; a marker holder movably mounted on the shroud, wherein the marker holder comprises a breakaway section, wherein the marker holder is configured to fail first at the breakaway section in response to force applied to the marker holder; a marker mounted on the marker holder, wherein the marker comprises a marker body and a marker base, wherein the marker base is received by the marker holder, wherein the marker body is pivotally mounted to the shroud; and, a closure removably aligned with the access port to close and to open the access port. In another aspect, the shroud assembly can further comprise a collar aligned on the shroud, wherein the marker holder is connected to the collar. In a further aspect, the collar can be rotatably aligned on the shroud. In still another aspect, the shroud can further comprise a shoulder, wherein the collar is rotatably aligned on the shoulder. In another aspect, the shroud further can comprise a wire receiver formed on the skirt. In yet a further aspect, the neck can comprise a neck thread, and wherein the closure comprises a closure thread, and wherein the closure thread engages the neck thread to removably connect the closure to the neck. In another aspect, the marker base can comprise a spring. In a further aspect, the shroud assembly can further comprise a shroud extender removably connected to the shroud, wherein the shroud extender comprises a first extender sidewall and a second extender sidewall, wherein the first extender sidewall and the second extender sidewall cooperate to define an extender channel, wherein a portion of the second extender sidewall is aligned in the neck through the access port, wherein the first extender sidewall comprises a shroud extender lip, wherein the shroud extender lip defines a shroud extender port, wherein the extender channel and the shroud extender port are in communication with the cavity, wherein the marker holder is removably connected to the shroud, and wherein the closure is removably aligned with the shroud extender port to open and close the shroud extender port. In still another aspect, the neck can comprise a neck thread, wherein the shroud extender comprises a bottom thread, and wherein the bottom thread engages the neck thread to removably connect the shroud extender to the neck. In a further aspect, the closure can comprise a closure thread, wherein the shroud extender comprises a top thread, and wherein the closure thread engages the top thread to removably connect the closure to the shroud extender. In yet another aspect, the shroud assembly can further comprise a shroud extender locking collar operably connected to the shroud extender. In still a further aspect, the first extender sidewall can have a first outer diameter and the second extender sidewall can have a second outer diameter, and wherein the first outer diameter is greater than the second outer diameter. In another aspect, the marker holder can comprise an arm, Wherein the breakaway section is aligned on the arm. In a further aspect, the closure can comprise a metal.

The present disclosure also encompasses a shroud assembly for covering a portion of an in-ground utility line, the shroud assembly comprising a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with and/or to receive a portion of an in-ground utility line; a collar movably aligned on the shroud; an arm connected to the collar, wherein the an comprises a breakaway section, wherein the arm is configured to fail first at the breakaway section in response to stress on the arm; a marker pivotally mounted on the arm, and, a closure removably aligned with the access port to close and open the access port. In another aspect, the shroud can further comprise a shoulder, wherein the collar is rotatably aligned on the shoulder. In another aspect, the shroud further can comprise a wire receiver formed on the skirt. In a further aspect, the marker can comprise a spring. In yet another aspect, the marker can be mounted on a marker receiver, and wherein the marker receiver is connected to the arm. In still a further aspect, the shroud assembly can further comprise a shroud extender removably connected to the shroud, wherein the shroud extender comprises a first extender sidewall and a second extender sidewall, wherein the first extender sidewall and the second extender sidewall cooperate to define an extender channel, wherein a portion of the second extender sidewall is aligned in the neck through the access port, wherein the extender channel is in communication with the cavity, wherein the first extender sidewall comprises a shroud extender lip, wherein the shroud extender lip defines a shroud extender port, wherein the collar is removably connected to the shroud, and wherein the closure is removably aligned with the shroud extender port to open and close the shroud extender port.

The present disclosure also encompasses a shroud assembly for covering a portion of an in-ground utility line, the shroud assembly comprising a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, Wherein the cavity is configured to align with a portion of an in-ground utility line through the base opening; a shroud extender removably connected to the shroud, wherein the shroud extender comprises a first extender sidewall and a second extender sidewall, wherein the first extender sidewall and the second extender sidewall cooperate to define a extender channel, wherein a portion of the second extender sidewall is aligned in the neck through the access port, wherein the extender channel is in communication with the cavity, wherein the first extender sidewall comprises a shroud extender lip, wherein the shroud extender lip defines a shroud extender port; and, a closure removably aligned with the shroud extender port to open and close the shroud extender port. In another aspect, the neck can comprise a neck thread, wherein the shroud extender comprises a bottom thread formed on the second extender sidewall, and wherein the bottom thread engages the neck thread to removably connect the shroud extender to the neck. In a further aspect, the closure can comprise a closure thread, wherein the shroud extender comprises a top thread formed on the first extender sidewall, and wherein the closure thread engages the shroud extender thread to removably connect the closure to the shroud extender. In still another aspect, the shroud assembly can further comprise a shroud extender locking collar operably connected to the shroud extender. In yet a further aspect, the first extender sidewall can have a first outer diameter and the second extender sidewall has a second outer diameter, and wherein the first outer diameter is greater than the second outer diameter. In another aspect, the shroud assembly can further comprise a marker removably mounted on the shroud, wherein the marker is pivotally aligned on the shroud. In a further aspect, the shroud assembly can further comprise a marker holder removably mounted on the shroud, wherein the marker holder comprises a breakaway section, Wherein the marker holder is configured to fail first at the breakaway section in response to stress on the marker holder, and wherein the marker is received by the marker holder. In yet another aspect, the shroud assembly can further comprise a collar rotatably aligned on the shroud, wherein the marker holder is mounted on the collar. In still a further aspect, the closure can comprise a metal. In yet another aspect, the shroud further can comprise a wire receiver formed on the skirt.

The present disclosure also encompasses a shroud assembly for covering a portion of an in-ground utility line, the shroud assembly comprising a shroud comprising a neck, a skirt extending from the neck and a shoulder projecting from the neck, wherein the skirt defines a cavity, wherein the skirt comprises a base, wherein the base defines a base opening, wherein the base opening opens to the cavity, wherein the neck is cylindrical, wherein the neck comprises a shroud lip, wherein the shroud lip defines an access port, wherein the access port is in communication with the cavity, wherein the cavity is configured to align with a portion of an in-ground utility line through the base opening; a collar removably aligned on the shoulder, wherein the collar is rotatable around the neck; a marker holder connected to the collar, wherein the marker holder comprises marker receiver connected to an arm, wherein the arm connects the marker receiver to the collar, wherein the arm comprises a breakaway groove disposed proximal to the collar and distal to the marker receiver, wherein the arm is configured to fail first at the breakaway groove in response to stress on the marker holder; a marker mounted on the marker receiver, wherein the marker comprises a marker body and a marker base, wherein the marker base is received by the marker receiver, wherein the marker body is pivotally mounted to the shroud; and, a closure threadably connected to the neck to close and open the access port.

The present disclosure also encompasses a shroud assembly to cover a portion of an in-ground utility line, the shroud assembly comprising a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with a portion of an in-ground utility line through the base opening; a collar rotatably mounted on the shroud; and, a marker pivotally mounted on the collar. In another aspect, the shroud assembly can further comprise an arm connected to the collar, wherein the marker is mounted on the arm. In a further aspect, the arm can comprise a breakaway section, wherein the arm is configured to fail first at the breakaway section in response to stress on the arm. In yet another aspect, the shroud assembly can further comprise a shroud extender removably connected to the shroud, wherein the shroud extender comprises a first extender sideall and a second extender sidewall, wherein the first extender sidewall and the second extender sidewall cooperate to define an extender channel, wherein a portion of the second extender sidewall is aligned in the neck through the access port, wherein the extender channel is in communication with the cavity, wherein the first extender sidewall comprises a shroud extender lip, acrd wherein the shroud extender lip defines a shroud extender port.

These and other aspects of the present disclosure are set forth in greater detail below and in the drawings for which a brief description is provided as follows.

DETAILED DESCRIPTION

Figure 1:
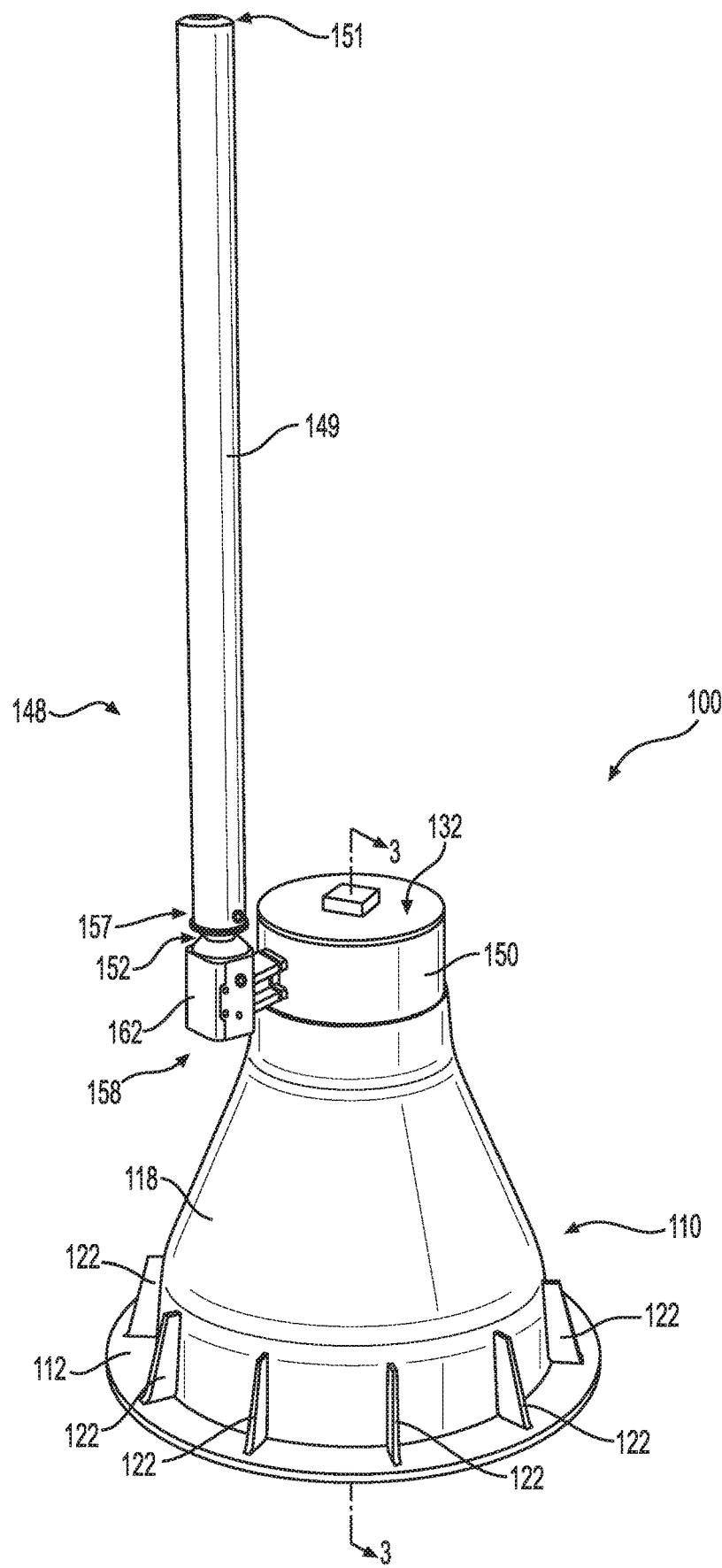
FIG. 1 is a perspective view of a shroud assembly for covering and marking a portion of a utility line, wherein the shroud assembly encompasses aspects of the present disclosure.

The present disclosure encompasses devices and assemblies that can be used to cover and/or protect portions of in-ground utility lines from damage from equipment and/or to identify the location of such portions of in-ground utility lines. The shroud assemblies described herein can be used to cover and/or identify portions of in-ground utility lines, such as clean out lines for sewer lines, meters for water lines, in-ground electrical lines, sewer lines, fiber optic cables, water lines, fuel pipe lines, chemical pipe lines, and other such in-ground utility lines. The shroud assemblies encompassed by the present disclosure can provide temporary or permanent protection and/or identification of particular utility lines when necessary, such as during the construction phase of new structures or renovations of existing construction. The shroud assemblies encompassed by the present disclosure comprise parts that are removably connectable to each other so as to allow different configurations of the shroud assembly to be assembled for use in varying conditions. Wherever possible, the application uses the same reference numbers throughout the drawings to refer to the same or similar items.

As used herein, the singular forms of "a," "an," and "the" encompasses the plural form thereof unless otherwise indicated. As used herein, the phrase "at least one" includes all numbers of one and greater. As used herein, the term "removably connected" encompasses configurations of elements such that one element or portion thereof optionally can be connected to, disconnected from and/or reconnected to another element in the normal course of use of the elements. As used herein, the term "removably mounted" encompasses configurations of elements such that one element or portion thereof optionally can be directly or indirectly mounted on, removed from and/or remounted on another element in the normal course of use of the elements. As used herein, the term "operably connected" encompasses configurations of elements wherein one element is connected directly and/or indirectly to another element so as to allow the two elements to function in the intended fashion within the apparatus. As used herein, the term "in communication" encompasses direct and/or indirect opening or passage between one element and another element during at least some time periods during use. As used herein, the to "grade level" refers to the top surface of the ground adjacent the relevant structures referenced in the present disclosure. As used herein, the term "aggregate material" refers to soil, gravel, rock, sand or similar particulate material that, when combined, can form a support surface.

FIGS. 1-15 illustrate a shroud assembly 100 encompassing aspects of the present disclosure. The shroud assembly 100 comprises several components that are removably connected to each other and that can be alternately employed so as to allow the shroud assembly 100 to be used in different configurations depending upon the circumstances of use. In the configuration of the shroud assembly 100 shown in FIGS. 1-4, the shroud assembly 100 comprises a shroud 110 to which is operably connected a closure 132. Also operably connected to the shroud 110 is a marker 148 mounted on a marker holder 156, which, in turn, is mounted on a collar 150 that is movably aligned on a shoulder 154 formed on the shroud 110. The shroud 110 is configured to fit over a portion of a utility line 160, such as the end of a clean out pipe of a sewer line, so as to offer some protection to and/or to identify that portion of the sewer line. The marker 148 is configured to extend upward beyond the top of the shroud 110 so as to mark the location of the portion of the utility line 160 over which the shroud 110 is disposed in order to reduce the probability that the shroud assembly 100 and/or the utility line 160 is inadvertently struck by a vehicle or some other piece of equipment and to expedite locating of relevant portions of the utility line 160.

Figure 2:
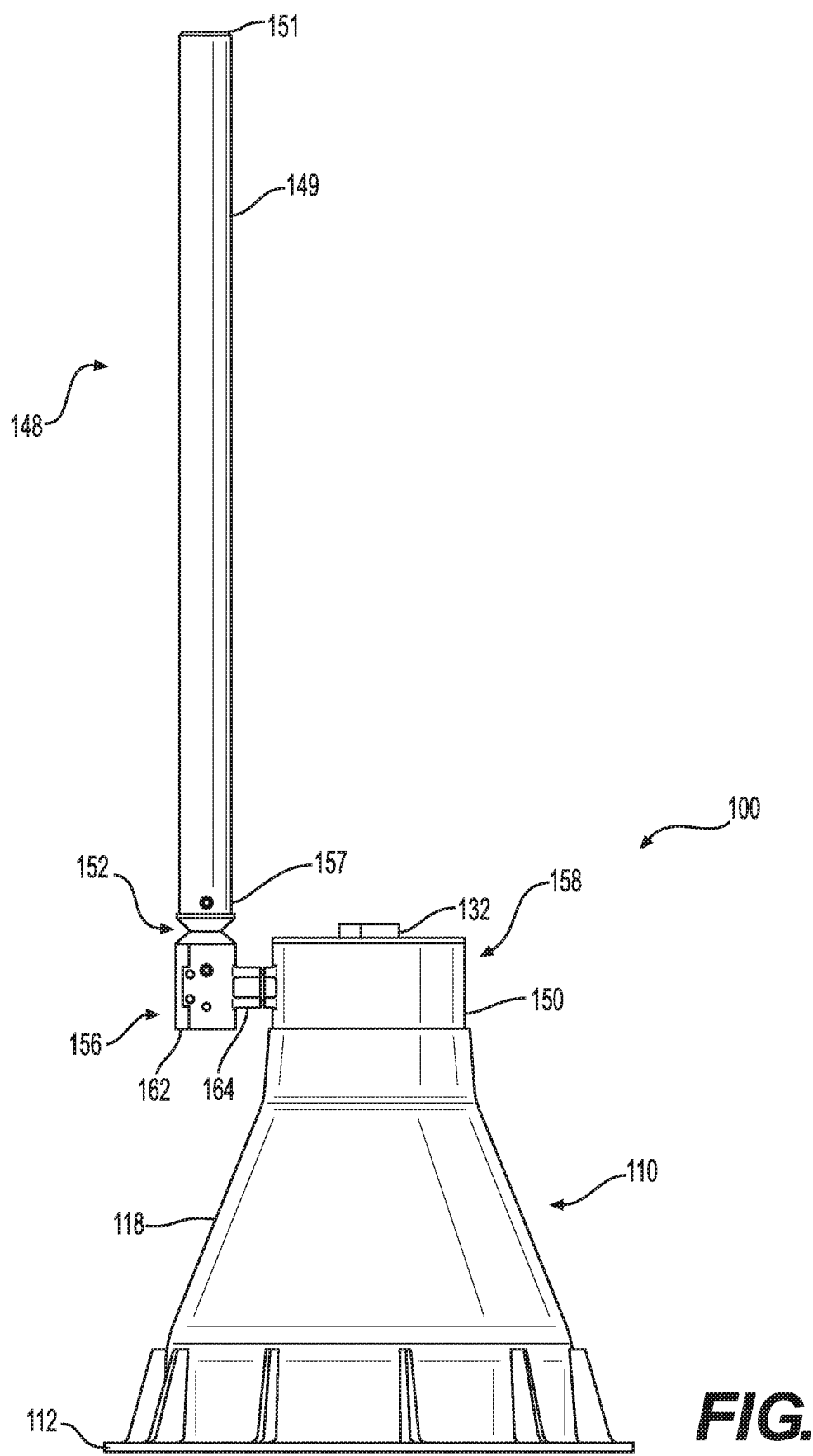
FIG. 2 is a side elevation view of the shroud assembly of FIG. 1.
Figure 3:
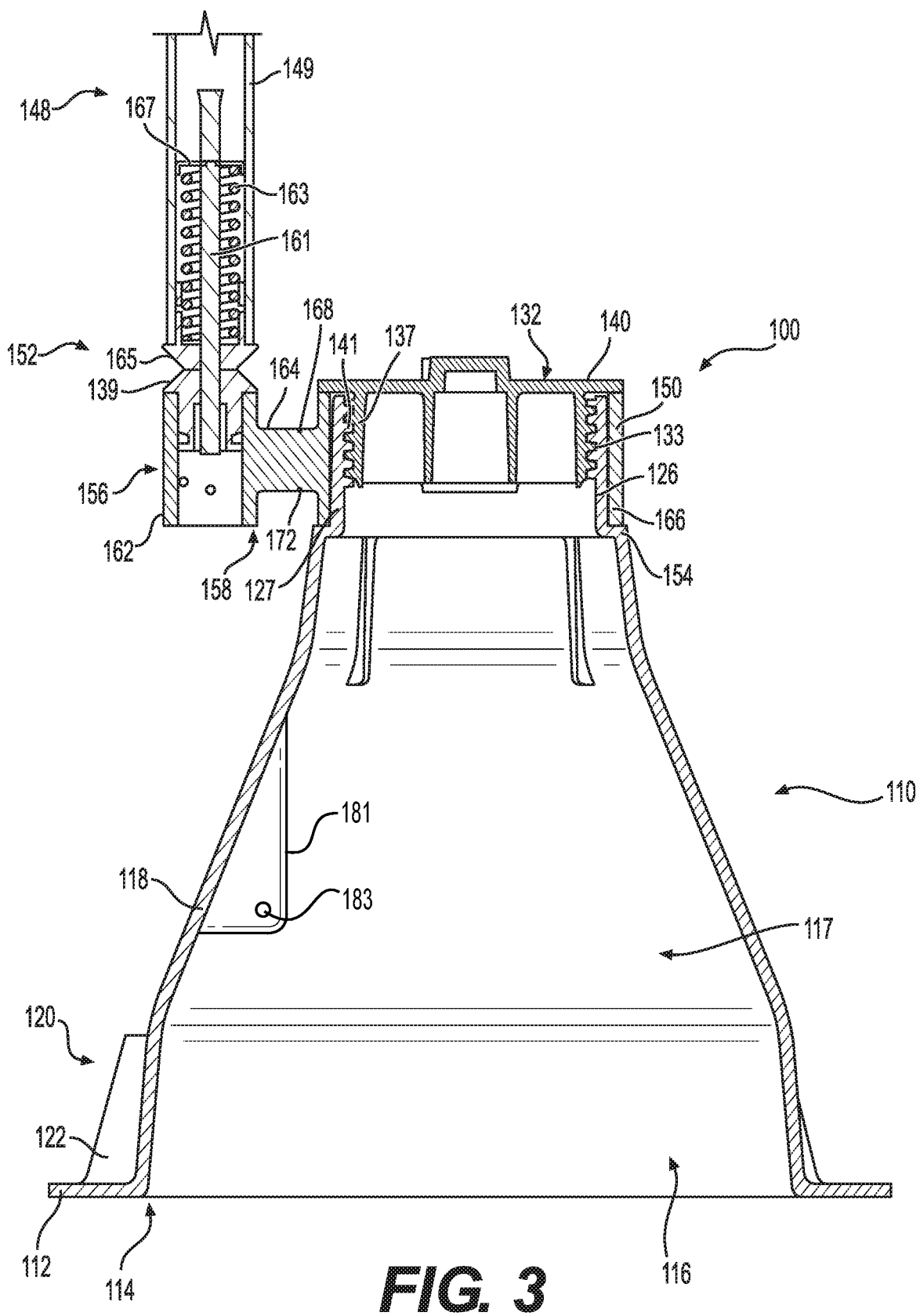
FIG. 3 is a cross sectional view of the shroud assembly as shown in FIG. 1 taken along line 3-3 and with a top portion of the marker not shown.
Figure 4:
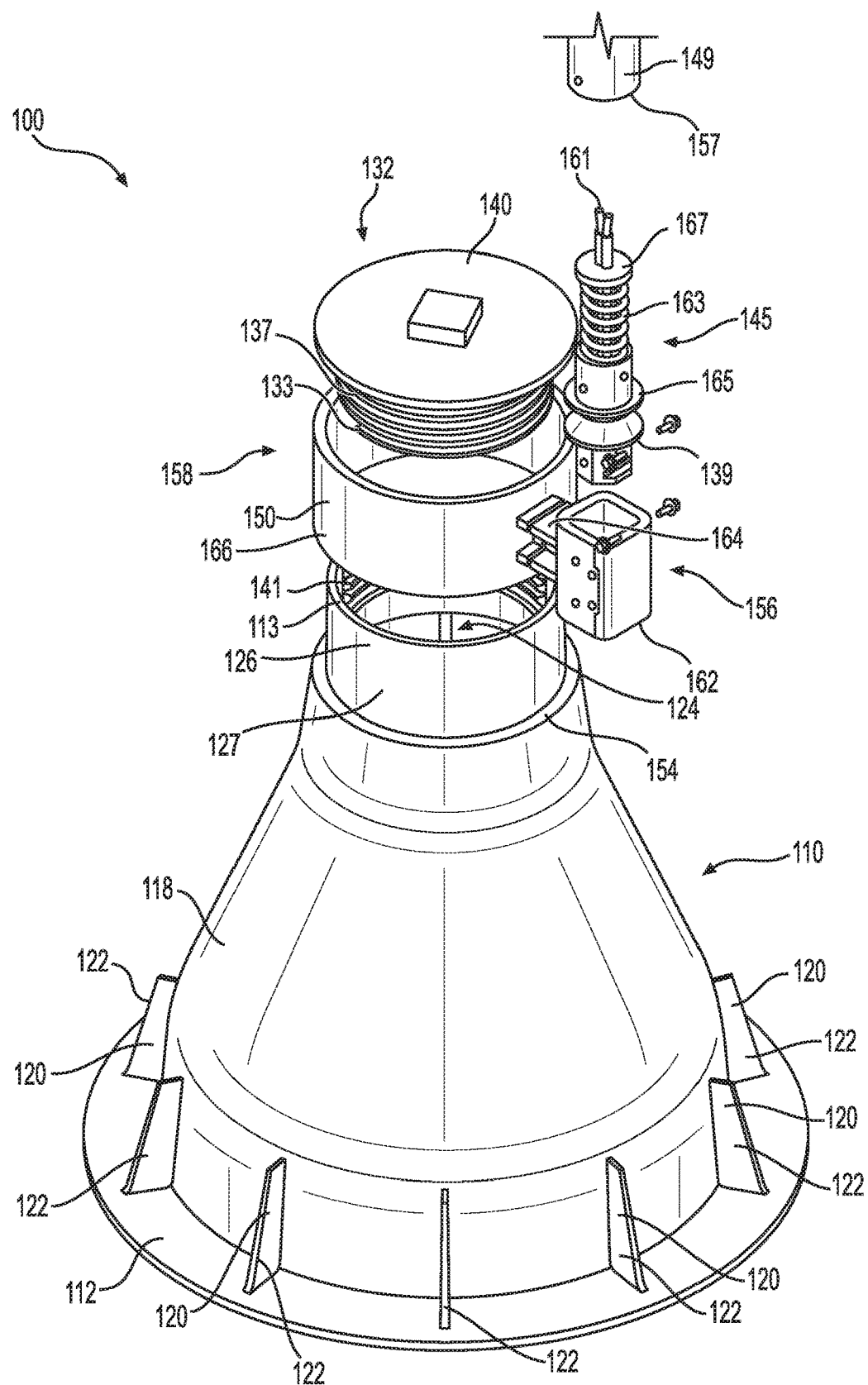
FIG. 4 is an exploded view of the shroud assembly shown in FIG. 2 with a top portion of the marker not shown.

As shown in FIGS. 1-4, the marker 148 comprises a marker base 152 supporting a marker body 149. The marker body 149 is configured to pivot in any direction relative to the bottom of the marker base 152. The marker body 149 comprises a marker top 151 and a marker bottom 157. The marker bottom 157 is aligned proximal to the marker base 152 and the marker top 151 is aligned distal to the marker base 152. The marker base 152 comprises a pedestal 139 and a marker pivot assembly 145 operably connected to the pedestal 139. The marker pivot assembly 145 allows for the marker body 149 to pivot multidirectionally. The marker pivot assembly 145 comprises a marker cable 161 that is connected to and extends upward from the pedestal 139. The marker pivot assembly 145 also comprises a pivot base 165 that is movably aligned on and/or above the pedestal 139. The marker pivot assembly 145 further comprises a marker spring 163 seated on the pivot base 165. The marker cable 161 extends upward through both the pivot base 165 and the marker spring 163. The marker pivot assembly 145 additionally comprises a cable plate 167 seated on the marker spring 163 and to which the marker cable 161 is connected. The marker cable 161 connects the marker pivot assembly 145 to the pedestal 139. The marker body 149 is connected to and/or aligned on the pivot base 165. At least a portion of the marker spring 163, at least a portion of the marker cable 161, and the cable plate 167 can be disposed in and/or aligned below the marker body 149. The marker cable 161 and the marker spring 163 can be axially aligned with the marker body 149. The pedestal 139 is disposed in and/or engages the marker receiver 162. As shown in FIG. 4, one or more screws, or other type of fasteners, can be used to secure the marker base 152 to the marker receiver 162.

When a force is applied to a side of the marker body 149 the marker pivot assembly 145 allows the marker body 149 to pivot downward in any direction. This pivoting of the marker body 149 occurs by the pivot base 165 pivoting relative to the pedestal 139. The pivoting causes the cable plate 167 to compress the marker spring 163. When the force is removed from the marker body 149 the energy stored in the compressed marker spring 163 is released and the marker pivot assembly 145 returns to its original alignment with the pivot base 165 seated on the pedestal 139. Other than the connection of the pedestal 139 to the marker receiver 162, the marker 148 is unattached to the remainder of the shroud assembly 100.

In one aspect, the marker body 149 can exhibit a length in the range of about 0.5 m to about 2.5 m. In another aspect, the marker body 149 can exhibit a length in the range of about 0.75 m to about 2 m. In yet another aspect, the marker body 149 can exhibit a length of approximately 1.5 m, thereby allowing the marker 148 to be visible at both extended distances from the shroud assembly 100 and near the shroud assembly 100 when viewed from an elevated position, such as the cab of a vehicle. In yet another aspect, the marker body 149 can be cylindrical. The marker 148 can have indicia formed thereon identifying the particular utility line, lot, unit, or company responsible for the installation or construction. While the marker 148 shown in FIGS. 1 and 2 is shown with a tubular body, the markers encompassed by the present disclosure can include markers of various sizes, shapes, and configurations.

Figure 5:
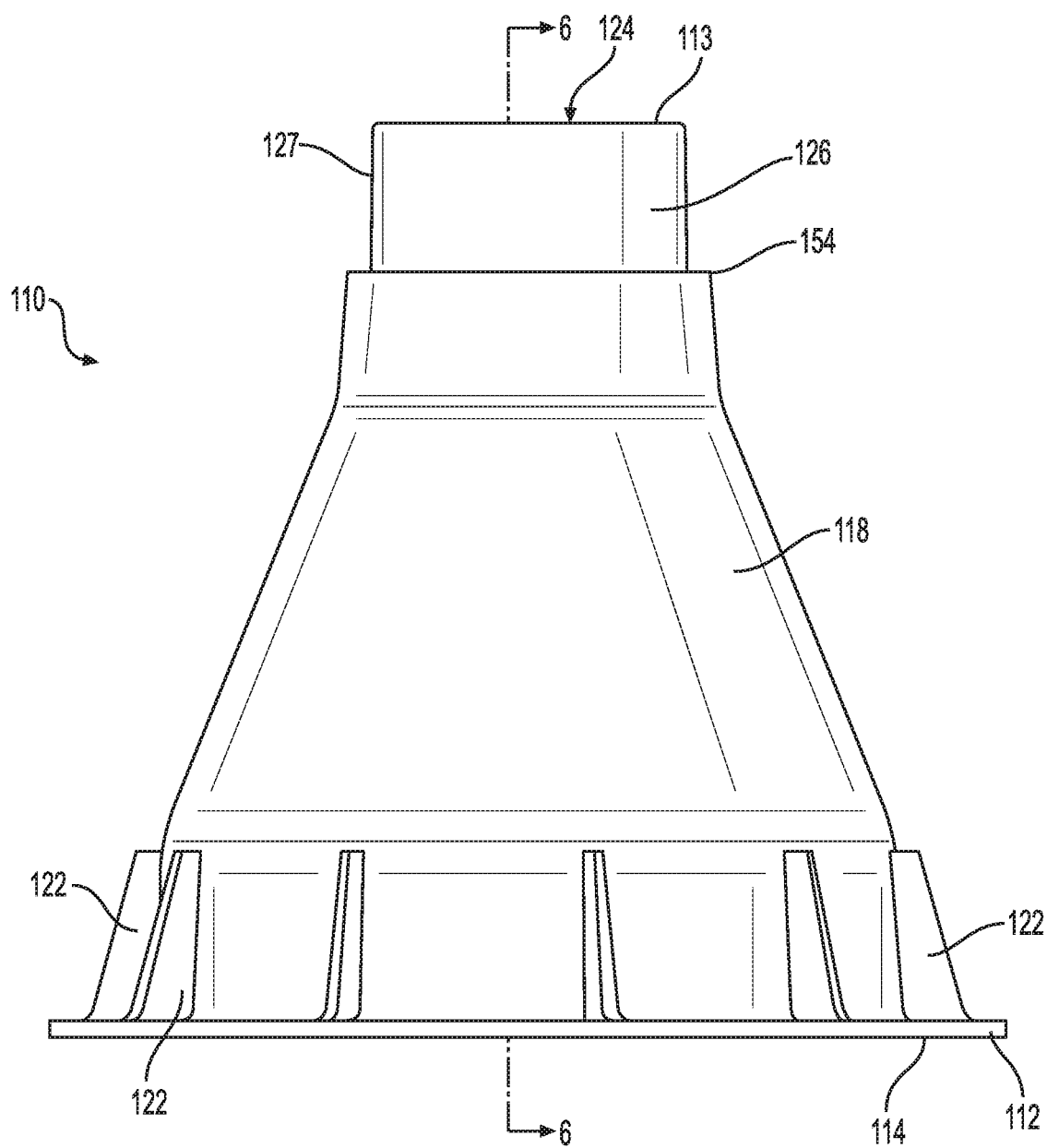
FIG. 5 is a side elevation view of the shroud of the shroud assembly shown in FIG. 1.
Figure 6:
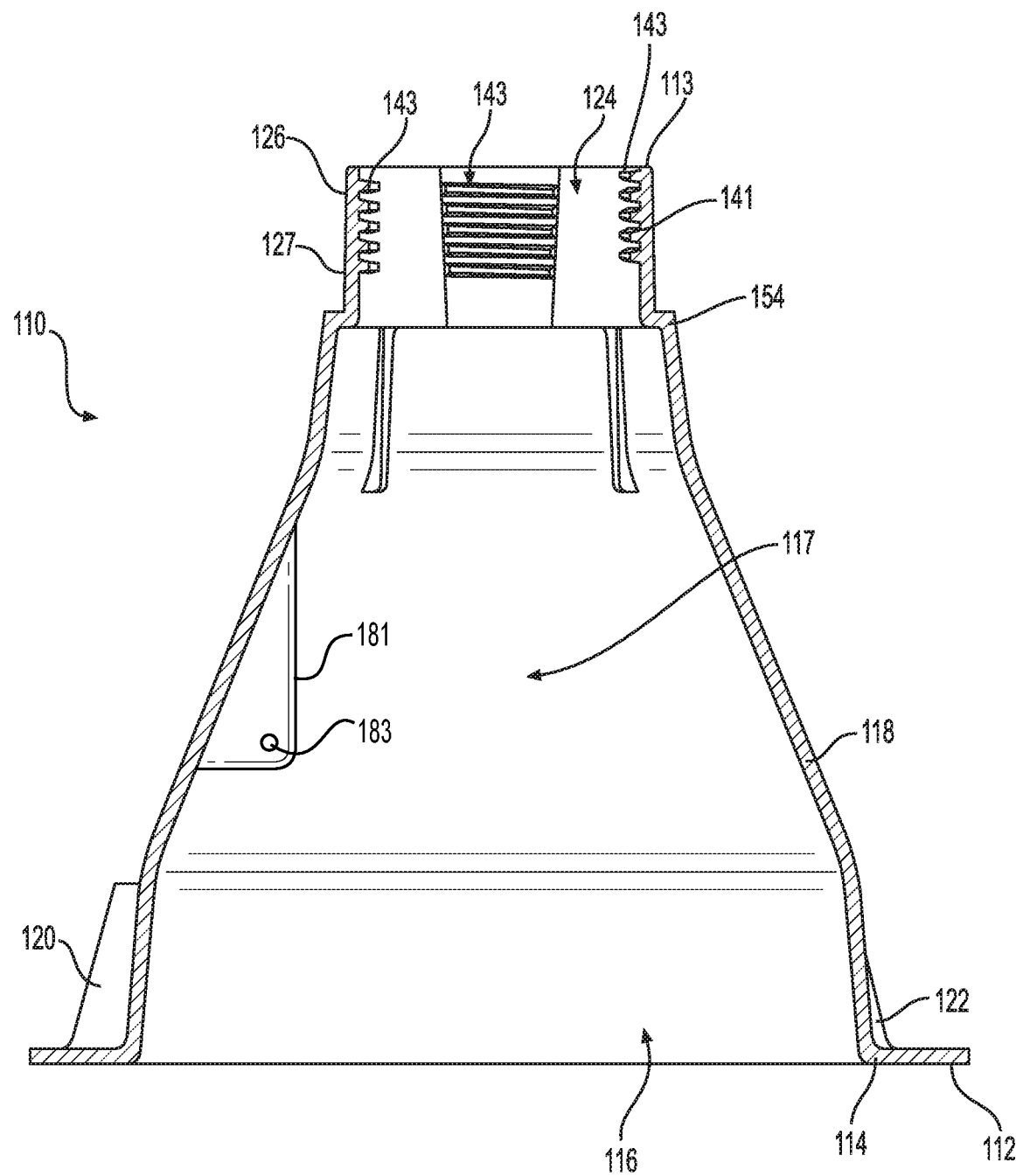
FIG. 6 is a cross sectional view of the shroud shown in FIG. 5 taken along line 6-6.

As shown in FIGS. 5 and 6, the shroud 110 comprises a neck 126 from which extends a shoulder 154. The neck 126 comprises a shroud lip 113 that defines an access port 124. The shroud 110 also comprises a skirt 118 that depends from the shoulder 154. Along the skirt 118 are disposed one or more supports 120 that reinforce the skirt 118 to allow the shroud 110 of the shroud assembly 100 to withstand compressive and/or shear forces applied thereto. The supports 120 can take the form of ribs 122 extending at least a portion of the distance between the shoulder 154 and a shroud base 114 disposed at the bottom of the shroud 110. Each rib 122 is shown extending outwardly from the skirt 118 and of trapezoidal configuration with the base of the rib 122 being wider than the top of the rib 122. Each rib 122 can be attached to a flange 112 that extends outwardly from the skirt 118. Each rib 122 can form an angle of approximately 90° with the flange 112. Other configurations of one or more supports 120 can be provided on the shroud 110 to reinforce the shroud 110 against forces applied thereto, whether by soil applied there over or equipment striking or running over the shroud 110.

As shown in FIGS. 5 and 6, the skirt 118 depends from the neck 126 and extends to the shroud base 114. All or a portion of the skirt 118 can be frustoconical with the bottom portion of the skirt 118 having a diameter that is larger than the diameter of the top portion of the skirt 118. As shown in FIG. 6, the skirt 118 has a top sidewall that has a first slope, a middle sidewall that has a second slope, and a bottom sidewall that has a third slope. In one aspect, the angle of the second slope is different than the angles of the first and the third slopes. In another aspect, each angle of the first, the second, and the third slopes differ from the angles of the other slopes. Supports 120 project outwardly from the skirt 118 adjacent the flange 112. The skirt 118 terminates at the shroud base 114, with the flange 112 defining at least a portion of the shroud base 114.

As shown in FIG. 6, the shroud 110 includes a concave portion with a base opening 116 formed in the shroud base 114. The sidewall of the shroud 110 that comprises the skirt 118 defines, at least in part, a cavity 117 that is in communication with the base opening 116. As shown in FIG. 6, the cavity 117 is in communication with both the base opening 116 and the interior of the neck 126 and access port 124, wherein the cavity 117 is disposed between the base opening 116 and the access port 124. The cavity 117 is configured to receive and/or be aligned with a portion of a utility line 160 therein, such as the end of a clean out line of a sewer. The cavity 117 can be configured such that the base opening 116 and the skirt 118 are wide enough to clear the top of the utility line 160 if the shroud 110 is tipped over so as to avoid damaging the utility line 160. In one aspect, the ratio of the width of the cavity 117 at the shroud base 114 to the height of the cavity 117 is sufficient to allow for the shroud assembly 100 to be tipped over without striking the utility line 160 situated therein. For example, the ratio of the width of base opening 116 to the height of the cavity 117 can be greater than 1:1.

As shown in FIG. 6, the shroud 110 of the shroud assembly 100 includes the access port 124 defined by the shroud lip 113 formed on the top of the neck 126. The neck 126 is defined by the neck sidewall 127 and is open to the cavity 117 defined by the skirt 118 and the shroud base 114. A neck thread 141 can be disposed either on the inside or the outside of the neck 126. As shown in FIG. 6, the neck thread 141 can be disposed on the inside of the neck 126 and comprise a plurality of neck thread segment sections 143 that cooperate to form the neck thread 141. The neck thread 141 can threadably engage a closure 132 and/or a shroud extender 210. The neck 126 allows for access through access port 124 to the interior of cavity 117 when the shroud assembly 100 is installed over and/or aligned with a portion of a utility line 160. The access port 124, the neck 126, the cavity 117, the skirt 118, the base opening 116, and the shroud base 114 can all be axially aligned, as shown in FIG. 6, and with the closure 132 also axially aligned with these body components when the closure 132 is attached to the neck 126. The axial alignment of these parts of the shroud assembly 100 allow for access to the interior of the shroud 110 and distribution of weight and/or compressive force to the shroud base 114. The present disclosure also encompasses shrouds that include parts that are not axially aligned.

The flange 112 can be annular or of another suitable configuration to provide for the distribution of forces placed on the shroud 110. The flange 112 is provided in the form of a ring that extends outwardly from the skirt 118 and includes a flat lower face that can serve as a footing for the shroud assembly 100 to allow for increased contact with the ground beneath the shroud base 114. The present disclosure also encompasses shrouds that have flanges that extend inwardly from the base of the body of the shroud and/or flanges that extend from the skirt and/or concave section of the body at one or more intermediate alignments between the top and base of the body of the shroud.

As shown in FIGS. 3 and 6, the shroud 110 also can comprise a wire receiver 181 formed on the skirt 118 and projecting inwardly therefrom into the cavity 117. The wire receiver 181 is shown in the configuration of a tab integrally formed with the skirt 117 and comprising an eyelet 183 formed therein. The eyelet 183 is sized and positioned to receive a tracer wire 191 there through. The present disclosure encompasses other configurations of the wire receiver 181, such as a hook, ring, cleat, or similar structure.

The diameter of the neck sidewall 127 and the neck thread 141 can be sized to receive an eight-inch (0.2 m) diameter closure. The eight-inch closure can be the same type closure used to close a clean out line, such as, for example, a cast iron or brass closure. With the neck 126 sized to accommodate such a closure, the shroud assembly 100 can be installed in ground permanently to cover a clean out line or other type of utility line 160.

The shroud 110 of the shroud assembly 100 can exhibit a total height, excluding the marker 148, in the range of about 0.4 m to about 1 m. In another aspect, the shroud 110 can exhibit a total height in the range of about 0.5 m to about 0.8 m. In yet another aspect, the shroud 110 can be about 0.6 m in height. In one aspect, the shroud assembly 100 can exhibit a ratio of the height of the marker 148 to the height of the shroud 110 greater than about 2:1, and, more specifically, about 2.5:1. The present disclosure encompasses shrouds with sidewalls that are other than frustoconical, such as cylindrical, elliptical, rectangular, or oblong.

As shown in FIGS. 1, 3, and 4, the shroud assembly 100 comprises a closure 132 disposed on and removably connected to the neck 126 of the shroud 110. The closure 132 comprises a closure sidewall 137 that depends from a closure top wall 140. The closure top wall 140 is circular and the closure sidewall 137 is cylindrical. A closure thread 133 projects from the closure sidewall 137 and is configured to threadably engage the neck thread 141 to connect the closure 132 to the shroud 110. The closure 132 is removably connected to the shroud 110 and is removably aligned with the access port 124 formed in the neck 126 of the shroud 110 and is aligned to allow access to a portion of a utility line 160 over which the shroud 110 is disposed. A knob can be formed on the closure top wall 140 that can be engaged by a wrench or other tool to tighten and untighten the threadable connection of the closure 132 to the neck 126 of the shroud 110.

Figure 7:
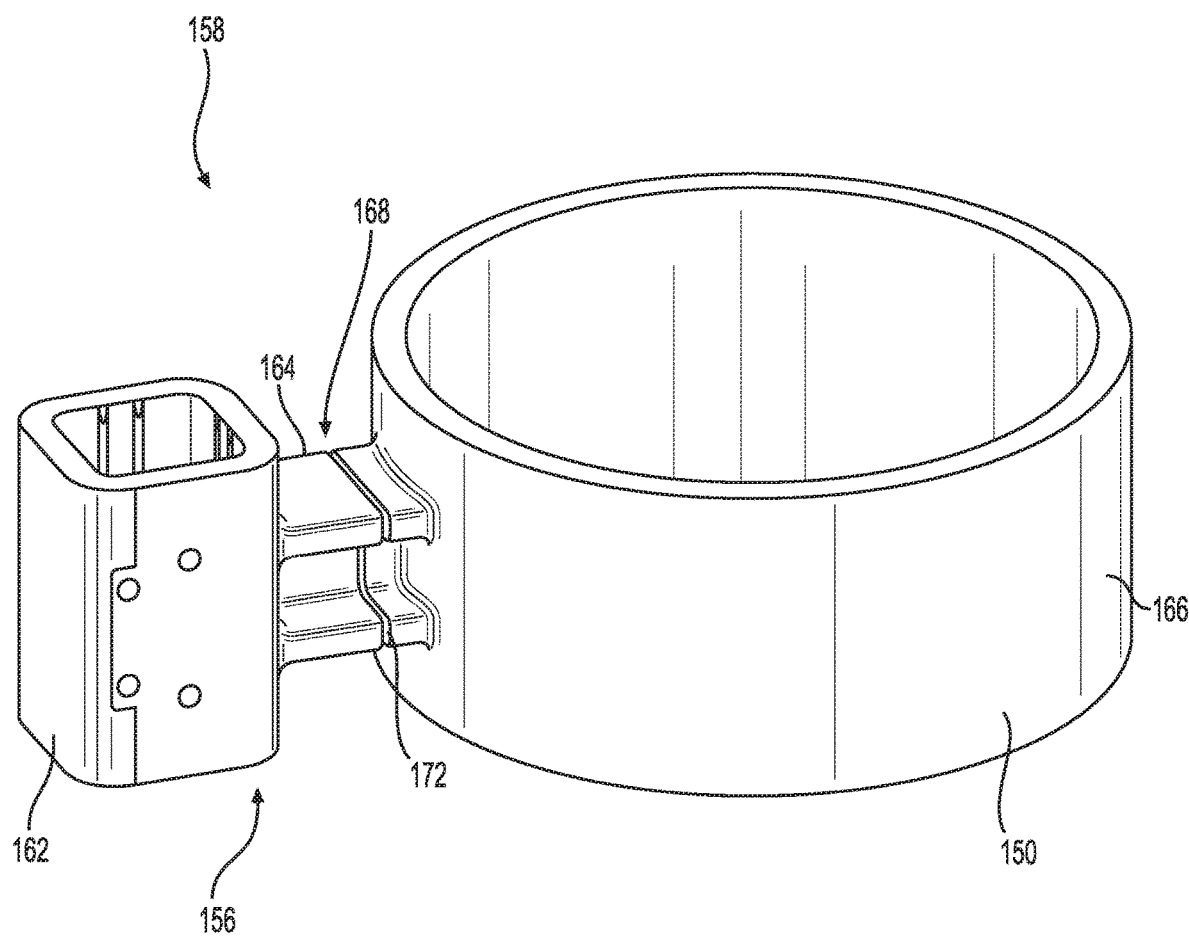
FIG. 7 is a perspective view of the marker holder-collar component of the shroud assembly of FIG. 1.
Figure 8:
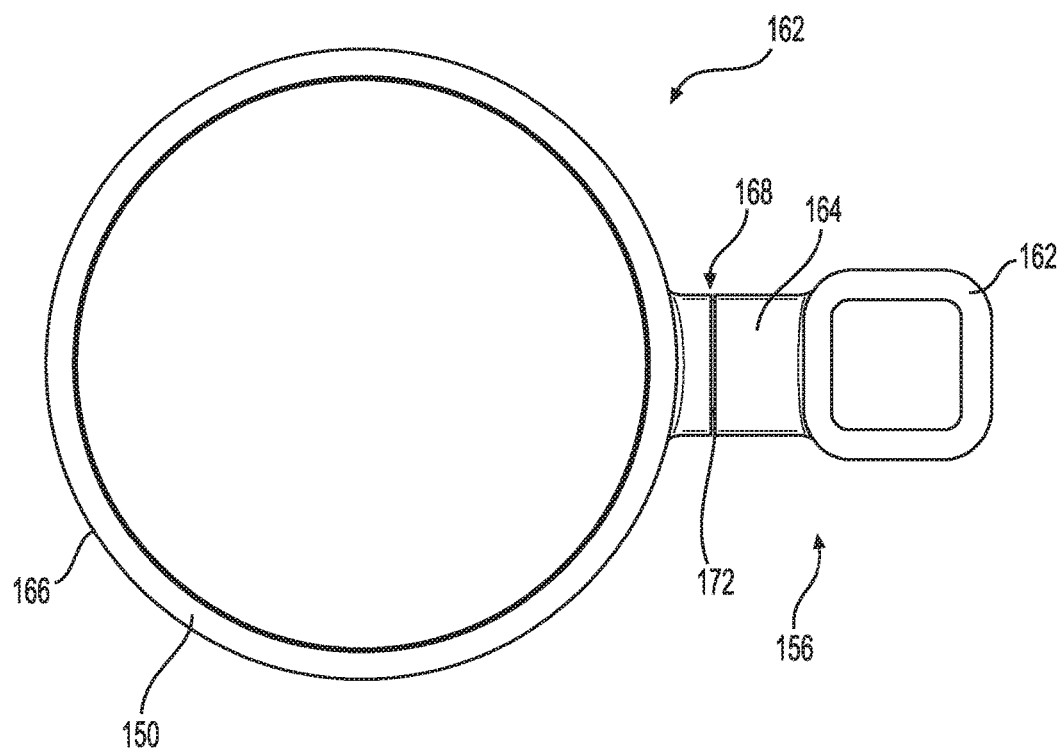
FIG. 8 is a top plan view of the marker holder-collar component shown in FIG. 7.
Figure 9:
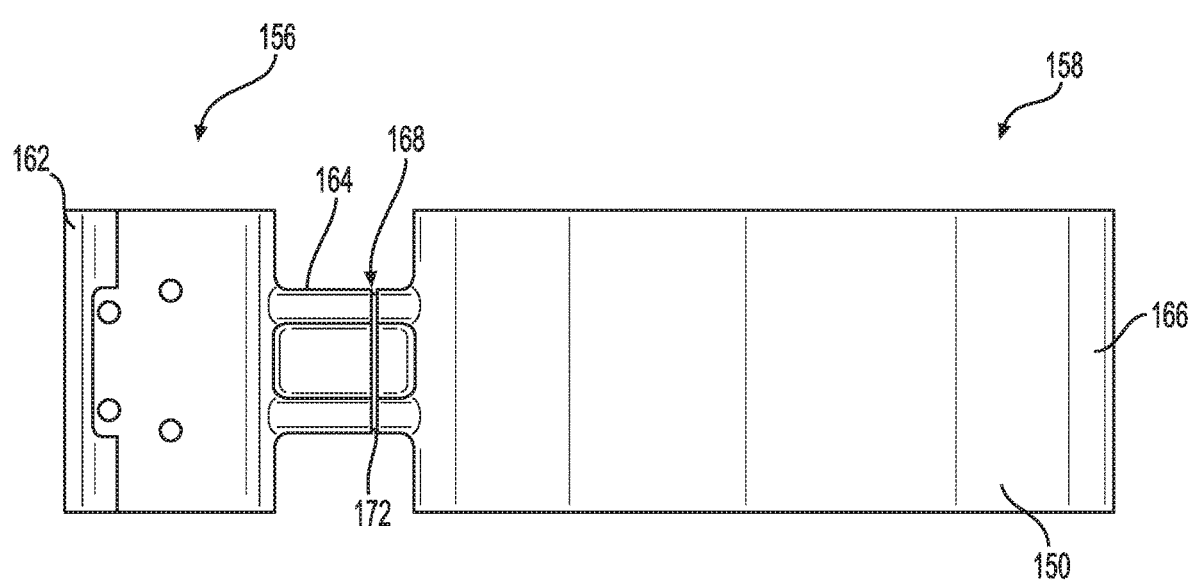
FIG. 9 is a side elevation view of the marker holder-collar component shown in FIG. 7.
Figure 10:
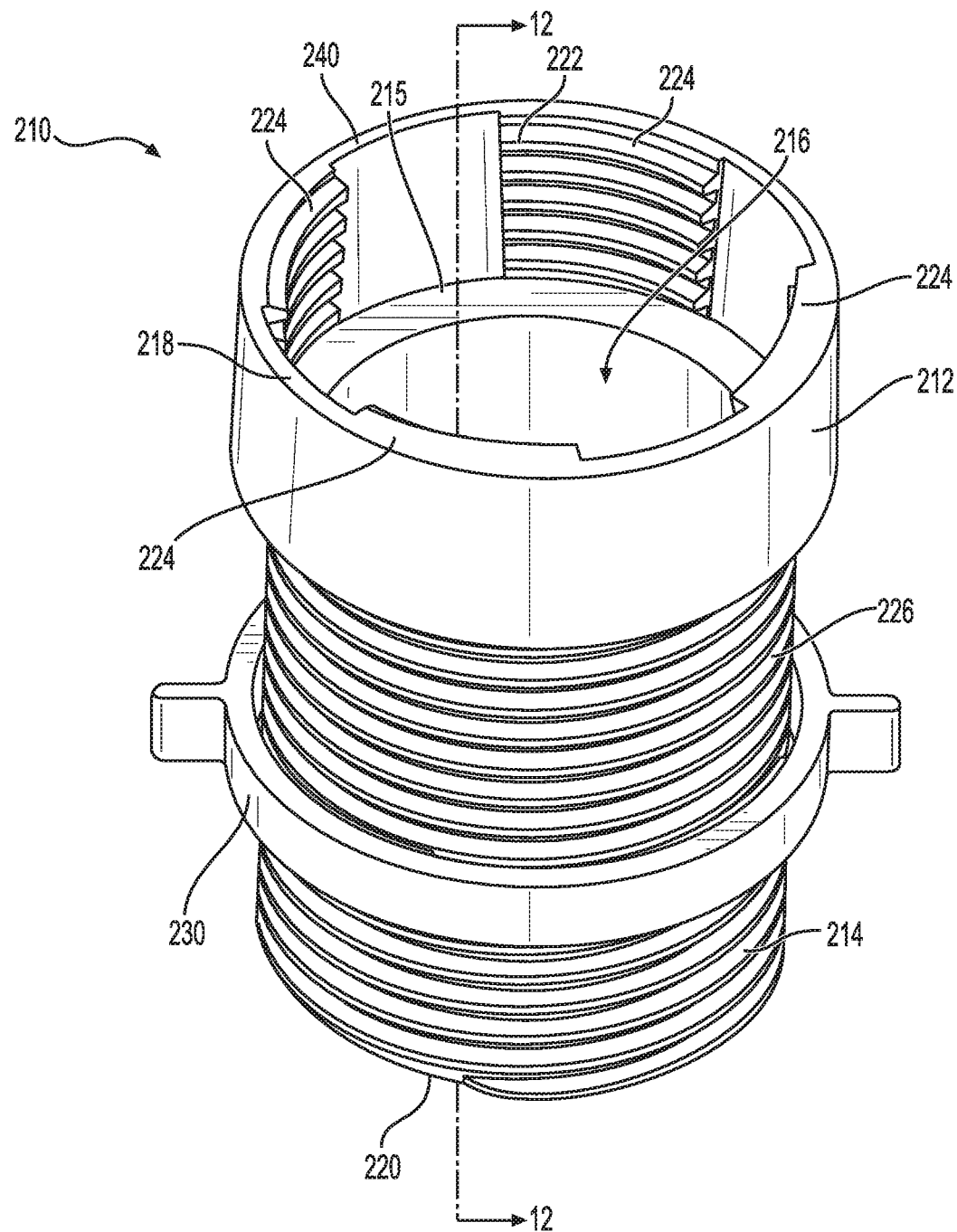
FIG. 10 is a perspective view of a shroud extender operably connected to a shroud extender locking collar, wherein the shroud extender and the shroud extender locking collar encompass aspects of the present disclosure.
Figure 11:
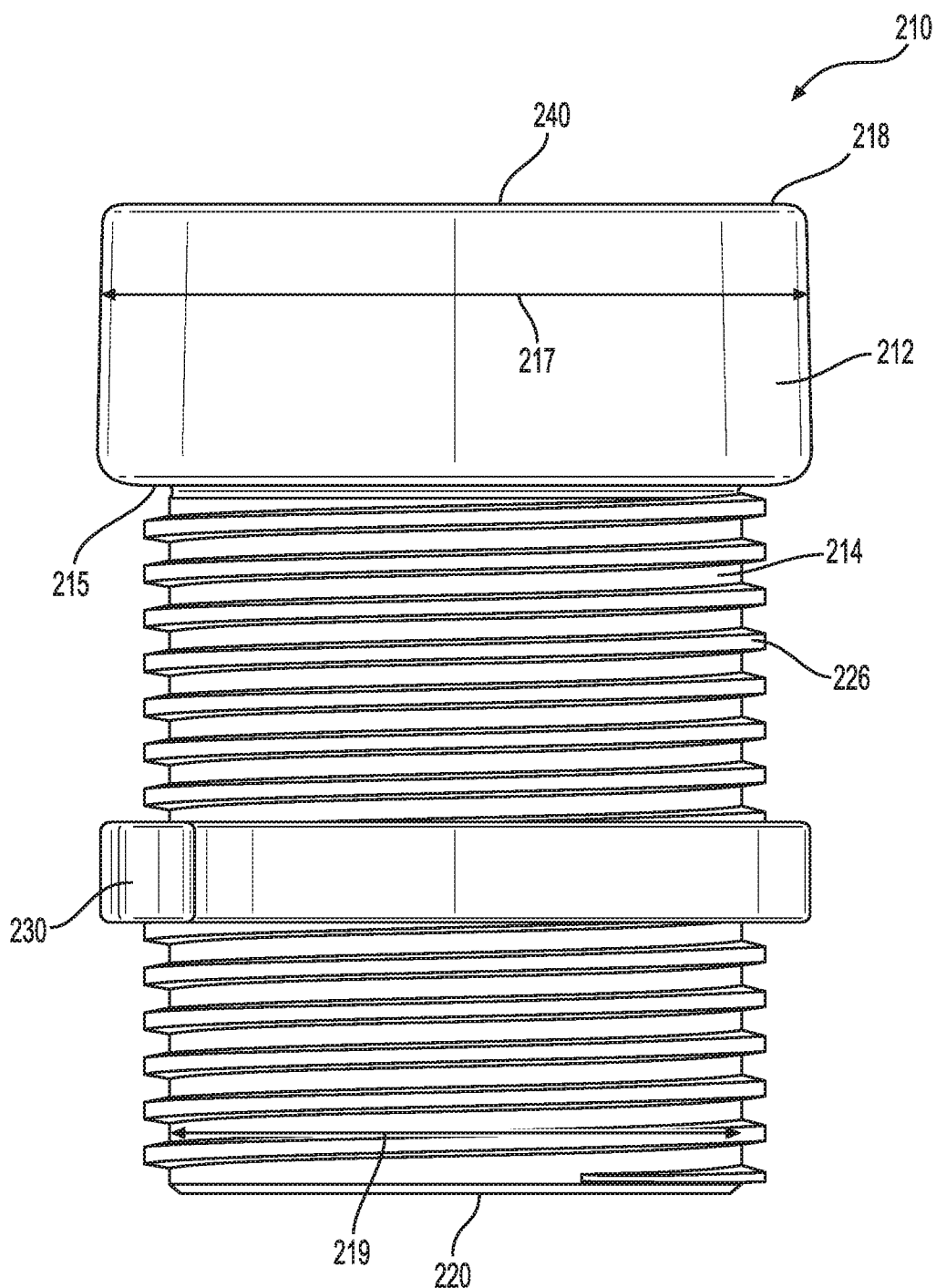
FIG. 11 is a side elevation view of the shroud extender and the shroud extender locking collar shown in FIG. 10.
Figure 12:
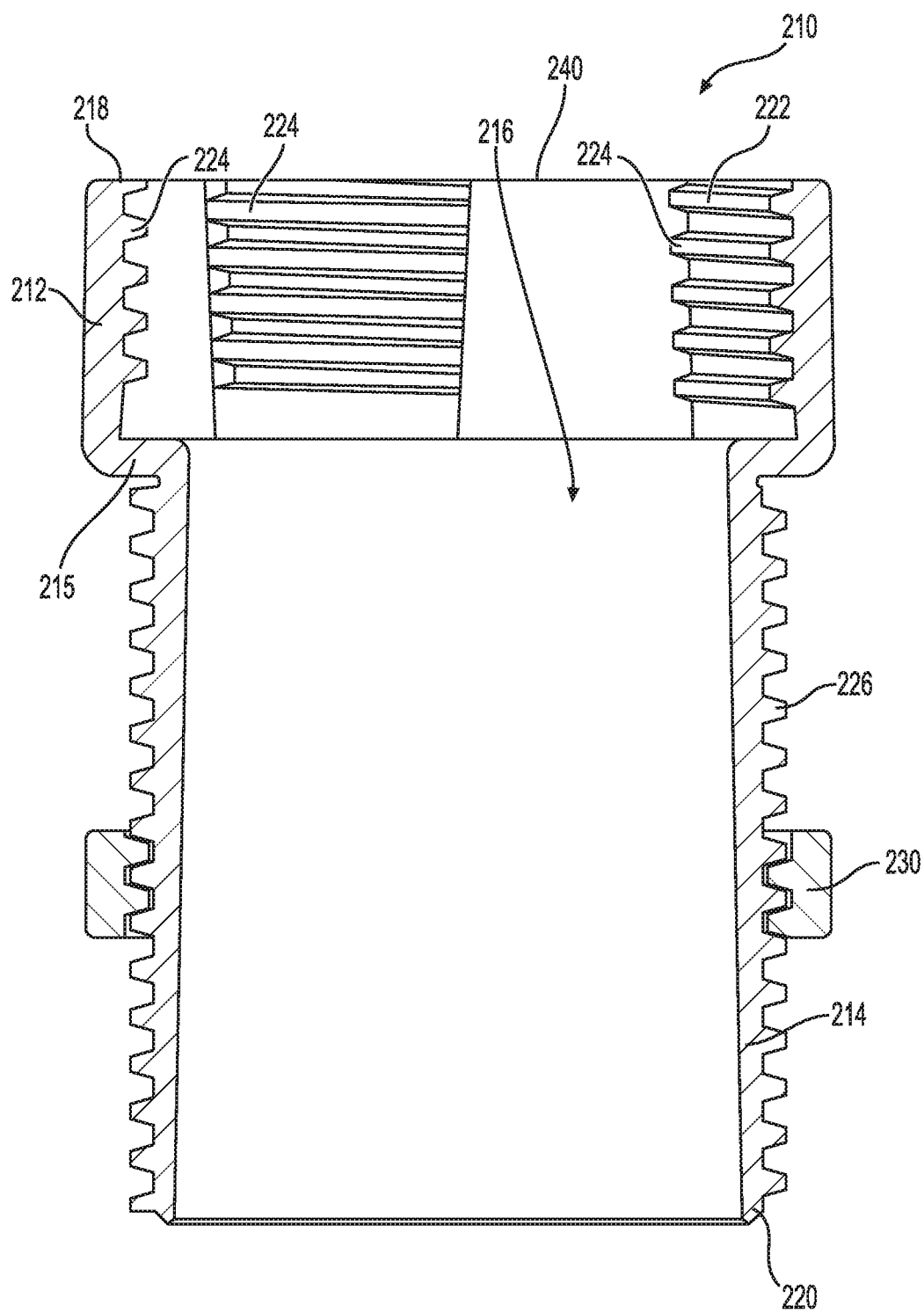
FIG. 12 is a cross sectional view of the shroud extender and the shroud extender locking collar shown in FIG. 10 taken along line 12-12.
Figure 13:
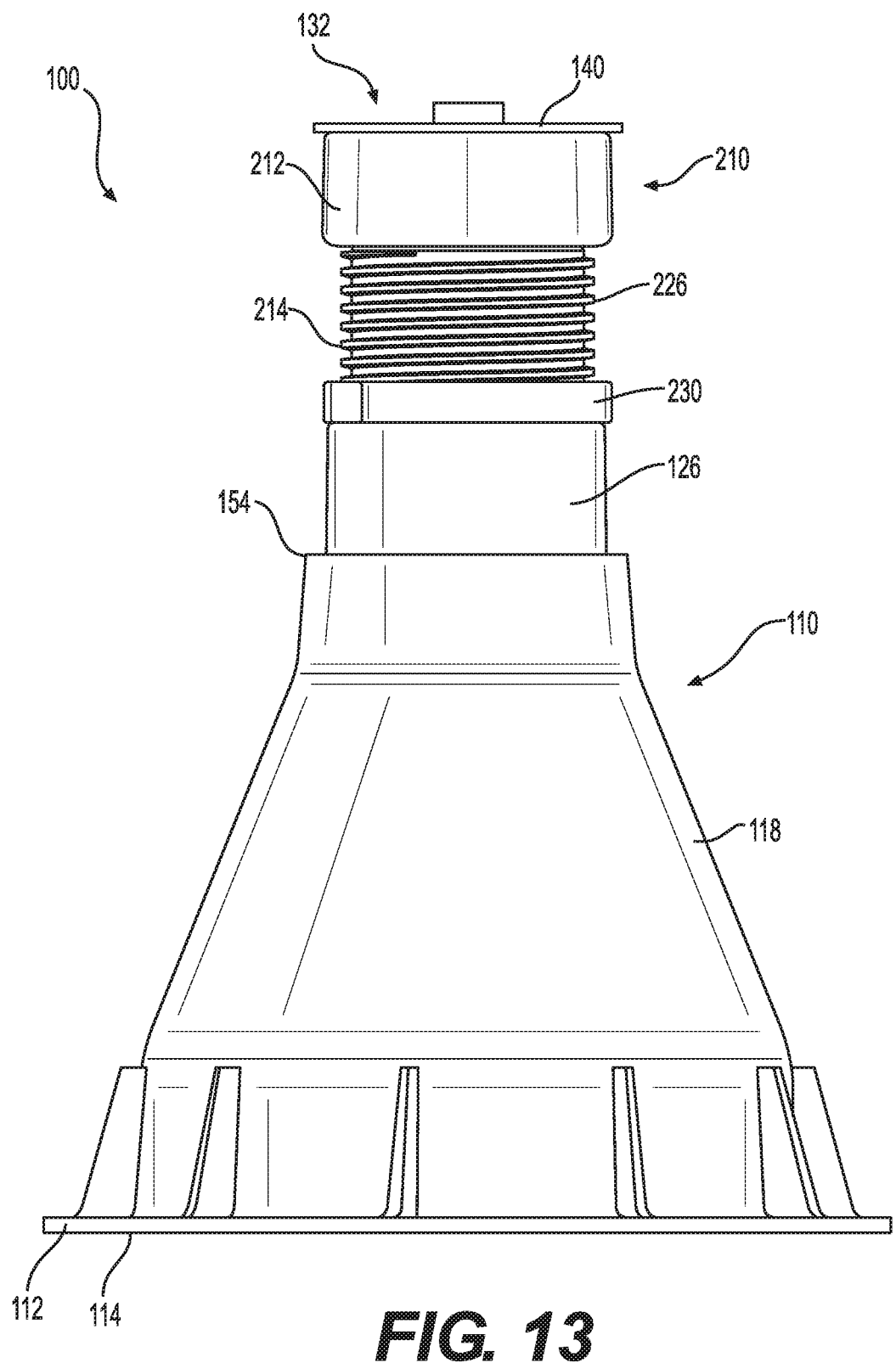
FIG. 13 is a side elevation view of a shroud assembly comprising the shroud shown in FIG. 5, the shroud extender shown in FIG. 10 threadably connected to the shroud, the shroud extender locking collar shown in FIG. 10, threadably connected to the shroud extender, and the closure shown in FIG. 4 threadably connected to the shroud extender.

As shown in FIGS. 7-9, the marker holder-collar component 158 is a unitary component that comprises a marker holder 156 connected to a collar 150. The present disclosure also encompasses configurations of a marker holder and collar that are not formed in a unitary component. The marker holder 156 comprises a marker receiver 162 connected to an arm 164. The arm 164 is attached to the collar 50 and connects the marker receiver 162 to the collar 150. The collar 150 comprises a collar sidewall 166 that is annular in configuration, forming a complete ring. The present disclosure also encompasses alternative configurations of the collar sidewall 166, such as a non-continuous ring in the configuration of a c-bracket or other appropriate shape. The inner diameter of the collar sidewall 166 is greater than the outer diameter of the neck 126 of the shroud 110, hut less than the outer diameter of the shoulder 154 of the shroud 110, thereby allowing the collar 150 to fit over the neck 126 and sit on the shoulder 154 of the shroud 110. The arm 164 extends radially from the outer side of the collar sidewall 166 and connects the marker receiver 162 to the collar 150. The arm 164 comprises a breakaway section 168 that can include one or more breakaway grooves 172 formed or other configurations that cause the arm 164 to be weaker in the breakaway section 168 than in any other part of the arm 164 or the marker receiver 162, thereby allowing the breakaway section 168 to fail first in response to a stress placed directly or indirectly on the arm 164 and/or marker receiver 162. The breakaway section 168 is disposed proximal to the collar 150 and distal to the marker receiver 162, as shown in FIGS. 7-9. The breakaway groove 172 is formed between the midline of the arm 164 and the collar 150. The marker holder-collar component 158 can be formed as a unitary piece from a polymeric material in a molding process. The marker receiver 162 is configured as a four-sided bracket defining a central opening therein for receiving the marker base 152 of the marker 148.

When removably connected to the shroud 110, the marker holder-collar component 158 is aligned over the neck 126 and rests on the shoulder 154 of the shroud 110. The marker holder-collar component 158 can rotate 360° or more or a portion thereof about the neck 126, thereby allowing the marker holder 156 to rotate about an axis extending through the center of the neck 126 and the collar 150 when a force is applied to the marker holder 156. The rotational movement of the marker holder-collar component 158 allows the marker holder-collar component 158 and the marker 148 mounted thereto to move away from objects that might strike one or both of them, thereby reducing the probability that either part will be damaged by the impact.

FIGS. 10-13 illustrate a shroud extender 210 that can be operably connected to the shroud 110 in order to extend the height of the shroud assembly 100. The shroud extender 210 comprises a first extender sidewall 212 connected to a second extender sidewall 213. The first extender sidewall 212 is connected to the second extender sidewall 214 by an extender flange 215 that projects outward from the top of the second extender sidewall 214 and attaches to the bottom of the first extender sidewall 212. The first extender sidewall 212 and the second extender sidewall 214 cooperate to define an extender channel 216. The first extender sidewall 212 terminates at the top of the shroud extender 210 at a shroud extender lip 218, and the second extender sidewall terminates at the bottom of the shroud extender 210 at an extender base 220. The extender channel 216 extends from the extender base 220 to the shroud extender lip 218 and is open at both the extender base 220 and the shroud extender lip 218. The shroud extender lip 218 defines a shroud extender port 240 through which the extender channel 216 can be accessed. The first extender sidewall 212 comprises a first outer diameter 217 and the second extender sidewall 214 comprises a second outer diameter 219, such that the first outer diameter 217 is greater than the second outer diameter 219.

The first extender sidewall 212 comprises a top thread 222 formed thereon. The top thread 222 can project inwardly from the first extender sidewall 212. The top thread 222 can comprise a plurality of thread segment sections 224. Each thread segment section 224 can comprise a plurality of thread segments aligned one above the other along the first extender sidewall 212. The plurality of thread segment sections 224 can cooperate to engage a closure thread 133 formed on the closure 132 to threadably attach the closure 132 to the shroud extender 210. The second extender sidewall 214 can comprise a bottom thread 226 that can project outwardly therefrom. The bottom thread 226 can engage the neck thread 141 that projects inwardly from the neck 126, thereby connecting the shroud extender 210 to the shroud 110.

A shroud extender locking collar 230 can be operably connected to the shroud extender 210. The shroud extender locking collar 230 can engage the bottom thread 226 formed on the second extender sidewall 214 and the neck 126 of the shroud 110 to secure the connection of the shroud extender 210 to the shroud 110.

In one configuration for covering a portion of a utility line 160, the shroud assembly 100 can be placed on top of the ground above grade level. The shroud assembly 100 is aligned such that the marker 148 extends upward from the location of the utility line 160, so that the shroud assembly 100 is readily visible to those that might be operating equipment and vehicles in the vicinity of the utility line 160. If the shroud assembly 100 is run over or struck by a piece of equipment or a vehicle, the shroud assembly 100 will resist the force and/or tend to topple over; but due to the width of the base opening 116 relative to the height of the utility line 160, the shroud 110 of the shroud assembly 100 will tend to clear the utility line 160 without striking the line, thereby reducing the likelihood of damage to the utility line 160. Alternatively, after the shroud assembly 100 is aligned over the utility line 160, such that a portion of the utility line 160 is disposed within the cavity 117 of the shroud 110 of the shroud, the shroud assembly 100 can be at least partially covered with soil, gravel, or other suitable material. In one particular aspect, the end of the utility line 160 can be arranged such that it is below grade level in a hole. After the shroud assembly 100 is placed over the utility line 160, the hole can be at least partially filled in to at or near grade level. In such an arrangement, all or part of the neck 126 of the shroud 110 can extend above grade level, or, alternatively, all of the shroud assembly 100, except for the marker 148, can be disposed below grade level. With the marker 148 extending upward above grade level, the location of the utility line 160 can be prominently identified. The configuration and/or the materials of construction of the shroud 110 of the shroud assembly 100 are such that, if a piece of equipment or vehicle is run over the shroud assembly 100, the compressive force applied to the shroud assembly 100 is dispersed across the shroud 110 to the flange 112 and to the ground upon which the flange 112 rests, instead of directly to the utility line 160, thereby reducing the probability that the utility line 160 is damaged during such an event.

Figure 14:
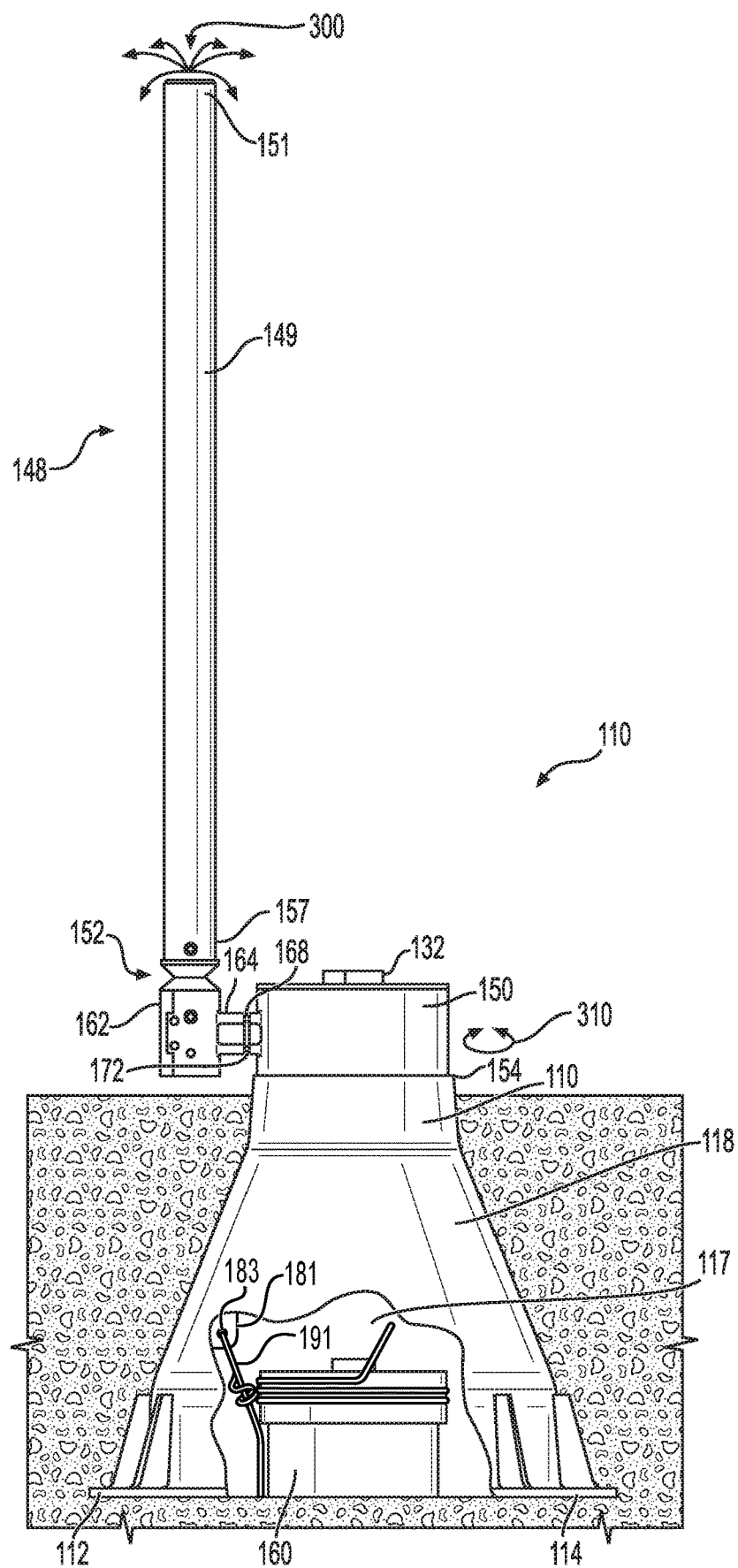
FIG. 14 is a partial cutaway side elevation view of the shroud assembly shown in FIG. 1 partially buried in the ground over a portion of an in-ground utility line.

FIG. 14 illustrates the shroud assembly 100 with the shroud extender 210 removed from and the marker 148 operably connected to the shroud 110. The shroud assembly 100 is shown installed in ground over a utility line 160. A majority of the shroud 110 is installed below grade level and the marker 148 extends upward above grade level to identify the location of the utility line 160. The shroud 110 is aligned over the utility line 160 so that the utility line 160 extends upward through the base opening 116 into the cavity 117. The cavity 117 and the utility line 160 disposed therein are accessible through the access port 124 when the closure 132 is disconnected from the neck 126. The marker 148 is aligned on the shroud 110 such that the marker 148 can pivot in any direction, and, since the marker holder-collar component 158 is movably aligned on the shoulder 154 of the shroud 110, the marker 148 can rotate around an axis extending through the neck 126. In this manner, the likelihood is increased that the marker 148 can withstand inadvertent strikes. The marker 148 can pivot on the pivot assembly 145 in any direction as shown by the directional arrows 300. The collar 150 can rotate in either direction, as shown by the directional arrows 310, around the neck 126 of the shroud 110. The pivoting movement of the marker 148 and the rotational movement of the marker holder-collar component 158 can allow the marker 148 and connected components to move out of the way of equipment that might strike the marker 148. Without the ability to pivot and rotate, the marker 148, when struck, might apply torqueing force to the other parts of the shroud assembly 100 thereby potentially resulting in damage to shroud assembly 100 and/or the utility line 160 and/or the dislodging of these components.

Figure 15:
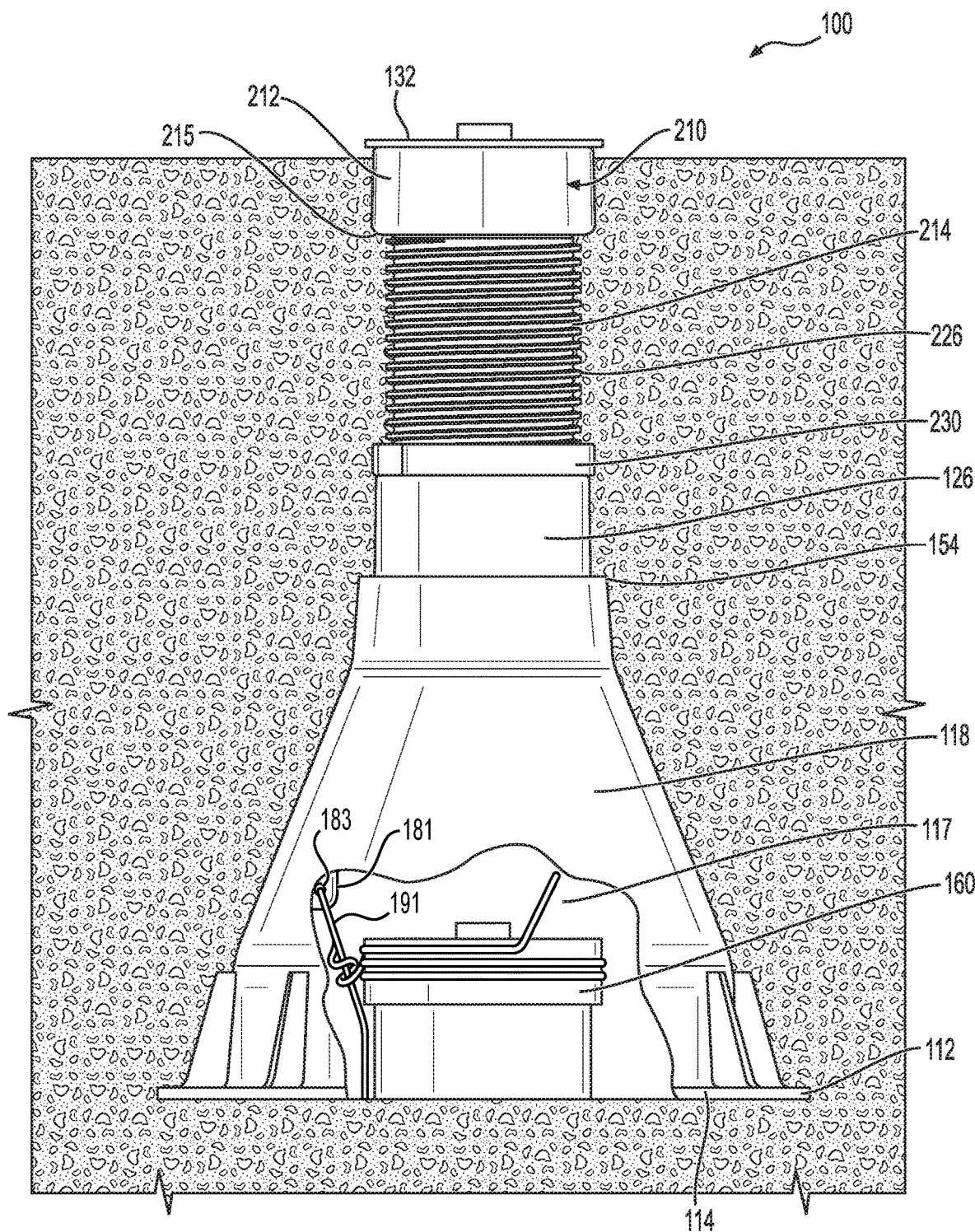
FIG. 15 is a partial cutaway side elevation view of the shroud assembly shown in FIG. 13 partially buried in the ground over a portion of an in-ground utility line.

FIG. 15 illustrates the shroud assembly 100 with the shroud extender 210 operably connected to the shroud 110 and without the shroud extender 210. The shroud assembly 100 is shown installed in ground over a utility line 160. The shroud 110 is aligned such that the utility line 160 is disposed in the cavity 117. The shroud extender 210 is connected to the shroud 110 by the insertion of the extender base 220 into the neck 126 of shroud 110. The second extender sidewall 214 is threadably connected to the neck 126 by the engagement of the bottom thread 226 with the neck thread 141. The shroud extender locking collar 230 engages both the second extender sidewall 214 of the shroud extender 210 and the neck 126 of the shroud 110 to secure the shroud extender 210 to the shroud 110. The closure 132 is threadably connected to the first extender sidewall 212 by the engagement of the closure thread 133 with the top thread 222. The alignment of the second extender sidewall 214 in the neck 126 thereby aligns the extender channel 216 so that it is in communication with the access port 124 and the cavity 117 of the shroud 110. Since the marker 148 and marker holder-collar component 158 are removably connected to the shroud 110, the marker 148 and the marker holder-collar component 158 can be removed from the shroud 110 prior to connection of the shroud extender 210 to the shroud 110 in the shroud assembly 100. The shroud extender 210 can be used in the shroud assembly 100 in various situations, such as when the grade level is raised around the shroud assembly 100 and grade level access to the utility line 160 is still desired. The shroud extender 210 can then be connected to the shroud 110 so that the closure 132 is at or near the raised ground level.

As shown in FIGS. 14 and 15, the shroud 110 can be placed over the end of the utility line 160 so that the end of the utility line 160 is disposed within the cavity 117. The base 114 extends around the utility line 160 and rests on aggregate material. With the aggregate material enclosing the base opening 116 formed in the base 214, the cavity 117 is enclosed. Alternatively, the shroud assembly 100 of the present disclosure can be installed such that a utility line 160 is aligned under the cavity 117 and base opening 116 so that the utility line 160 is accessible from above grade level through the cavity 117 and base opening 116, but without the utility line 160 extending up through the base opening 116 into the cavity 117, In both alignments, the shroud 110 is aligned over the utility line 160 so that access to the utility line 160 is available through the neck 126 of the shroud 110, when the closure 132 is removed from either the neck 126 or the shroud extender 210.

As shown in FIGS. 14 and 15, an above ground portion of a tracer wire 191 can be threaded through the eyelet 183 and retained by the wire receiver 181. Tracer wires are often installed in conjunction with utility lines, such as sewer lines, gas lines, water lines, fiber optic cables, and used in conjunction with such utility lines to aid in locating the lines from above ground. The portion of the tracer wire 191 extending above ground is threaded through the wire receiver 181 and wrapped around the access port, or end, of the utility line 160. The engagement of the tracer wire 191 with the wire receiver 181 secures the end of the tracer wire in place and can allow for the tracer wire 191 to be accessible without the need for digging.

The shroud 100, the marker holder-collar component 158, the shroud extender 210, and/or the closure 132, and/or portions of any these components can be formed from various materials have sufficiently high elastic modulus and high compressive, flexural and impact strength and can include, but are not limited to, metal, such as cast iron and steel, concrete, ceramic, high density polymers and combinations thereof. In one aspect, the parts of the shroud assembly can be formed of one or more polymers or monomeric moieties including, but not limited to, polycarbonate, polyimide, acetal copolymer, polyamide-imide, polyethylene terephthalate, acrylic, ultra high density polyethylene, fiber reinforced polymers, monomers, copolymers and combinations thereof.

The shroud assembly 100 also can include a metal insert, not shown, operably connected to the shroud 110 and/or the closure 132, so that the metal insert can be used to aid in the location of the shroud assembly 100 with a metal detector if the shroud assembly 100 is completely buried or otherwise not easily visible. The metal insert can be in the form of a plate or suitable shape for integration into the shroud assembly 100.

The alignments and configurations of the parts of the shroud assembly disclosed herein can be varied without departing from the scope of the present disclosure. The shroud assemblies encompassed by the present disclosure can include overall heights that vary from the examples and can exhibit ratios of the marker height to the shroud height that vary from the stated examples. Other embodiments of the shroud assembly set forth in the present disclosure will be apparent to those skilled in the art from their consideration of the specification and practice of the present disclosure disclosed in this document. It is intended that the specification and examples be considered as exemplary only, with the true scope and spirit of the present disclosure being indicated by the following claims.

The invention claimed is:

1. A shroud assembly for covering a portion of an in-ground utility line, the shroud assembly comprising:
  a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with a portion of an in-ground utility line through the base opening;
  a marker holder movably mounted on the shroud, wherein the marker holder comprises a breakaway groove, wherein the marker holder is configured to fail first at the breakaway groove in response to force applied to the marker holder;
  a marker mounted on the marker holder, wherein the marker comprises a marker body and a marker base, wherein the marker base is received by the marker holder, wherein the marker body is pivotally mounted to the shroud; and,
  a closure removably aligned with the access port to close and to open the access port.

2. The shroud assembly of claim 1, further comprising a collar aligned on the shroud, wherein the marker holder is connected to the collar.

3. The shroud assembly of claim 2, wherein the collar is rotatably aligned on the shroud.

4. The shroud assembly of claim 3, wherein the shroud further comprises a shoulder, wherein the collar is rotatably aligned on the shoulder.

5. The shroud assembly of claim 1, wherein the neck comprises a neck thread, and wherein the closure comprises a closure thread, and wherein the closure thread engages the neck thread to removably connect the closure to the neck.

6. The shroud assembly of claim 1, wherein the marker base comprises a spring.

7. The shroud assembly of claim 1, further comprising a shroud extender removably connected to the shroud, wherein the shroud extender comprises a first extender sidewall and a second extender sidewall, Wherein the first extender sidewall and the second extender sidewall cooperate to define an extender channel, wherein a portion of the second extender sidewall is aligned in the neck through the access port, wherein the first extender sidewall comprises a shroud extender lip, wherein the shroud extender lip defines a shroud extender port, wherein the extender channel and the shroud extender port are in communication with the cavity, wherein the marker holder is removably connected to the shroud, and wherein the closure is removably aligned with the shroud extender port to open and close the shroud extender port.

8. The shroud assembly of claim 7, wherein the neck comprises a neck thread, wherein the shroud extender comprises a bottom thread, and wherein the bottom thread engages the neck thread to removably connect the shroud extender to the neck.

9. The shroud assembly of claim 8, wherein the closure comprises a closure thread, wherein the shroud extender comprises a top thread, and wherein the closure thread engages the top thread to removably connect the closure to the shroud extender.

10. The shroud assembly of claim 7, wherein the first extender sidewall has a first outer diameter and the second extender sidewall has a second outer diameter, and wherein the first outer diameter is greater than the second outer diameter.

11. The shroud assembly of claim 1, wherein the marker holder comprises an arm, wherein the breakaway section is aligned on the arm.

12. The shroud assembly of claim 1, wherein the closure comprises a metal.

13. A shroud assembly for covering a portion of an in-ground utility line, the shroud assembly comprising:
  a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with a portion of an in-ground utility line through the base opening;
  a marker holder movably mounted on the shroud, wherein the marker holder comprises a breakaway section, wherein the marker holder is configured to fail first at the breakaway section in response to force applied to the marker holder;
  a marker mounted on the marker holder, wherein the marker comprises a marker body and a marker base, wherein the marker base is received by the marker holder, wherein the marker body is pivotally mounted to the shroud;
  a closure removably aligned with the access port to close and to open the access port,
  a shroud extender removably connected to the shroud, wherein the shroud extender comprises a first extender sidewall and a second extender sidewall, wherein the first extender sidewall and the second extender sidewall cooperate to define an extender channel, wherein a portion of the second extender sidewall is aligned in the neck through the access port, wherein the first extender sidewall comprises a shroud extender lip, wherein the shroud extender lip defines a shroud extender port, wherein the extender channel and the shroud extender port are in communication with the cavity, wherein the marker holder is removably connected to the shroud, and wherein the closure is removably aligned with the shroud extender port to open and close the shroud extender port; and,
  a shroud extender locking collar operably connected to the shroud extender.

14. A shroud assembly for covering a portion of an in-ground utility line, the shroud assembly comprising:
  a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with a portion of an in-ground utility line;
a collar movably aligned on the shroud;
an arm connected to the collar, wherein the UM comprises a breakaway groove, wherein the arm is configured to fail first at the breakaway groove in response to stress on the arm;
a marker pivotally mounted on the arm, and,
a closure removably aligned with the access port to close and open the access port.

15. The shroud assembly of claim 14, wherein the shroud further comprises a shoulder, wherein the collar is rotatably aligned on the shoulder.

16. The shroud assembly of claim 14, wherein the marker comprises a spring.

17. The shroud assembly of claim 14, wherein the marker is mounted on a marker receiver, and wherein the marker receiver is connected to the arm.

18. The shroud assembly of claim 14, further comprising a shroud extender removably connected to the shroud, wherein the shroud extender comprises a first extender sideall and a second extender sidewall, wherein the first extender sidewall and the second extender sidewall cooperate to define an extender channel, wherein a portion of the second extender sidewall is aligned in the neck through the access port, wherein the extender channel is in communication with the cavity, Wherein the first extender sidewall comprises a shroud extender lip, wherein the shroud extender lip defines a shroud extender port, wherein the collar is removably connected to the shroud, and wherein the closure is removably aligned with the shroud extender port to open and close the shroud extender port.

19. A shroud assembly for covering a portion of an in-ground utility line, the shroud assembly comprising:
a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with a portion of an in-ground utility line through the base opening;
a shroud extender removably connected to the shroud, wherein the shroud extender comprises a first extender sidewall and a second extender sidewall, wherein the first extender sidewall and the second extender sidewall cooperate to define an extender channel, wherein a portion of the second extender sidewall is aligned in the neck through the access port, Wherein the extender channel is in communication with the cavity, wherein the first extender sidewall comprises a shroud extender lip, wherein the shroud extender lip defines a shroud extender port;
a closure removably aligned with the shroud extender port to open and close the shroud extender port; and,
a shroud extender locking collar operably connected to the shroud extender.

20. The shroud assembly of claim 19, Wherein the neck comprises a neck thread, wherein the shroud extender comprises a bottom thread formed on the second extender sidewall, and wherein the bottom thread engages the neck thread to removably connect the shroud extender to the neck.

21. The shroud assembly of claim 19, wherein the closure comprises a closure thread, wherein the shroud extender comprises a top thread formed on the first extender sidewall, and wherein the closure thread engages the shroud extender thread to removably connect the closure to the shroud extender.

22. The shroud assembly of claim 19, wherein the first extender sidewall has a first outer diameter and the second extender sidewall has a second outer diameter, and wherein the first outer diameter is greater than the second outer diameter.

23. The shroud assembly of claim 19, further comprising a marker removably mounted on the shroud, wherein the marker is pivotally aligned on the shroud.

24. The shroud assembly of claim 23, further comprising a marker holder removably mounted on the shroud, wherein the marker holder comprises a breakaway section, wherein the marker holder is configured to fail first at the breakaway section in response to stress on the marker holder, and wherein the marker is received by the marker holder.

25. The shroud assembly of claim 19, wherein the closure comprises a metal.

26. A shroud assembly for covering a portion of an in-ground utility line, the shroud assembly comprising:
a shroud comprising a neck, a skirt extending from the neck and a shoulder projecting from the neck, wherein the skirt defines a cavity, wherein the skirt comprises a base, wherein the base defines a base opening, wherein the base opening opens to the cavity, wherein the neck is cylindrical, wherein the neck comprises a shroud lip, wherein the shroud lip defines an access port, wherein the access port is in communication with the cavity, wherein the cavity is configured to align with a portion of an in-ground utility line through the base opening;
a collar removably aligned on the shoulder, wherein the collar is rotatable around the neck;
a marker holder connected to the collar, wherein the marker holder comprises marker receiver connected to an arm, wherein the arm connects the marker receiver to the collar, wherein the arm comprises a breakaway groove disposed proximal to the collar and distal to the marker receiver, wherein the arm is configured to fail first at the breakaway groove in response to stress on the marker holder;
a marker mounted on the marker receiver, wherein the marker comprises a marker body and a marker base, wherein the marker base is received by the marker receiver, wherein the marker body is pivotally mounted to the shroud; and,
a closure threadably connected to the neck to close and open the access port.

27. A shroud assembly for covering a portion of an in-ground utility line, the shroud assembly comprising:
a shroud comprising a neck and a skirt extending from the neck, wherein the skirt defines a cavity, wherein the skirt comprises a base, wherein the base defines a base opening, wherein the base opening opens to the cavity, wherein the neck comprises a shroud lip, wherein the shroud lip defines an access port, wherein the access port is in communication with the cavity, wherein the cavity is configured to align with a portion of an in-ground utility line through the base opening;
a collar rotatably mounted on the shroud;
a marker pivotally mounted on the collar; and,
a closure removably aligned with the access port to close and to open the access port, wherein the collar is separate from the closure.

28. The shroud assembly of claim 27, further comprising an arm connected to the collar, wherein the marker is mounted on the arm.

29. The shroud assembly of claim 28, wherein the arm comprises a breakaway section, wherein the arm is configured to fail first at the breakaway section in response to stress on the arm.

30. The shroud assembly of claim 27, further comprising a shroud extender removably connected to the shroud, Wherein the shroud extender comprises a first extender sidewall and a second extender sidewall, wherein the first extender sidewall and the second extender sidewall cooperate to define an extender channel, wherein a portion of the second extender sidewall is aligned in the neck through the access port, wherein the extender channel is in communication with the cavity, wherein the first extender sidewall comprises a shroud extender lip, and wherein the shroud extender lip defines a shroud extender port.

* * * * *